US012055346B1

(12) United States Patent
Stumbo

(10) Patent No.: US 12,055,346 B1
(45) Date of Patent: Aug. 6, 2024

(54) DRYER FOR PORTABLE ELECTRONIC DEVICES

(71) Applicant: Robert Stumbo, Haslet, TX (US)

(72) Inventor: Robert Stumbo, Haslet, TX (US)

( * ) Notice: Subject to any disclaimer, the term of this patent is extended or adjusted under 35 U.S.C. 154(b) by 209 days.

(21) Appl. No.: 17/826,220

(22) Filed: May 27, 2022

Related U.S. Application Data

(60) Provisional application No. 63/193,741, filed on May 27, 2021.

(51) Int. Cl.
*F26B 5/04* (2006.01)
*F26B 9/00* (2006.01)
*F26B 21/00* (2006.01)
*F26B 21/14* (2006.01)

(52) U.S. Cl.
CPC ................ *F26B 5/04* (2013.01); *F26B 9/003* (2013.01); *F26B 21/006* (2013.01); *F26B 21/14* (2013.01)

(58) Field of Classification Search
CPC .. F26B 5/04; F26B 9/003; F26B 21/06; F26B 21/14
USPC .............................................................. 34/92
See application file for complete search history.

(56) References Cited

U.S. PATENT DOCUMENTS 1,539,846 A * 6/1925 Jansson ..................... F26B 5/04 251/297
5,727,333 A * 3/1998 Folan ...................... F26B 5/065 34/92
6,996,918 B2 * 2/2006 Bsirske ................... C02F 1/725 34/389
7,654,010 B2 * 2/2010 Moriya ............ H01L 21/67017 34/80
8,061,056 B2 * 11/2011 Hedberg ................ B04B 15/08 118/52
10,772,477 B2 * 9/2020 Khazaieli .................. A47L 5/38
11,384,980 B2 * 7/2022 Triglia, Jr. ............ F26B 13/008
11,774,423 B1 * 10/2023 Guo ........................ G01M 3/02 204/409
11,841,189 B1 * 12/2023 Andrews ............... F26B 21/003
2023/0240489 A1 * 8/2023 Khazaieli .............. D06F 58/203 34/596

FOREIGN PATENT DOCUMENTS

CA 2863649 A1 * 8/2013 .............. F26B 21/08
DE 1632013 A1 * 8/1970
WO WO-2021055805 A1 * 3/2021 ............... A61L 2/04

* cited by examiner

*Primary Examiner* — Stephen M Gravini
(74) *Attorney, Agent, or Firm* — Kenneth L. Tolar

(57) ABSTRACT

A dryer for portable electronic devices includes a hollow case having a top section and a bottom section that open and close in a clamshell-type fashion. The case further includes an interior compartment that is dimensioned to receive a vacuum pump, a nitrogen bottle, hoses, and most portable electronic devices. On one of the outer walls is a vacuum port for connecting a hose to the vacuum pump to remove moisture from the case interior. Adjacent the vacuum port is a nitrogen inlet port for connecting a second hose to the nitrogen bottle to deliver nitrogen to the case interior. Accordingly, the pump is activated for a predetermined duration to remove atmospheric water vapor and then the case is saturated with nitrogen to remove any residual moisture from the electronic device.

5 Claims, 1 Drawing Sheet

DRYER FOR PORTABLE ELECTRONIC DEVICES

CROSS REFERENCE TO RELATED APPLICATIONS

This application claims priority of provisional application No. 63/193,741 filed on May 27, 2021, the specification of which is incorporated herein by reference.

BACKGROUND OF THE INVENTION

The present invention relates to a portable dryer for removing moisture from portable electronic devices.

DESCRIPTION OF THE PRIOR ART

Portable electronic devices, such as smart phones, laptops, and tablet computers, are inevitably exposed to rain, spillage, or accumulated water. When saturated with moisture, the electronic device is inoperable unless quickly dried. Moreover, operating a wet electronic device can cause an irreparable failure that requires an expensive equipment replacement.

Accordingly, there is currently a need for a device that quickly removes moisture from certain electronic devices. The present invention addresses this need by providing an airtight case for housing a wet electronic device that is evacuated with a vacuum pump and infused with nitrogen to remove atmospheric moisture.

SUMMARY OF THE INVENTION

The present invention relates to a dryer for a portable electronic device comprising a hollow case having a top section and a bottom section that open and close in a clamshell-type fashion. The case further includes an interior compartment that is dimensioned to receive a vacuum pump, a nitrogen bottle, hoses, and most portable electronic devices. On one of the outer walls is a vacuum port for connecting a hose to the vacuum pump to remove moisture from the case interior. Adjacent the vacuum port is a nitrogen inlet port for connecting a second hose to the nitrogen bottle to deliver nitrogen to the case interior. Accordingly, the pump is activated for a predetermined duration to remove atmospheric water vapor and then the case is saturated with nitrogen to remove any residual moisture from the electronic device.

It is therefore an object of the present invention to provide a device that quickly and easily dries portable electronic devices.

It is therefore another object of the present invention to provide a dryer that restores moisture-damaged electronic devices to an operational condition.

It is therefore yet another object of the present invention to provide a dryer that quickly saturates an electronic device with nitrogen to remove accumulated moisture.

Other objects, features, and advantages of the present invention will become readily apparent from the following detailed description of the preferred embodiment when considered with the attached drawings and the appended claims.

DESCRIPTION OF THE PREFERRED EMBODIMENT

Figures 1, 2, 3, 4, 5, 6, 7:
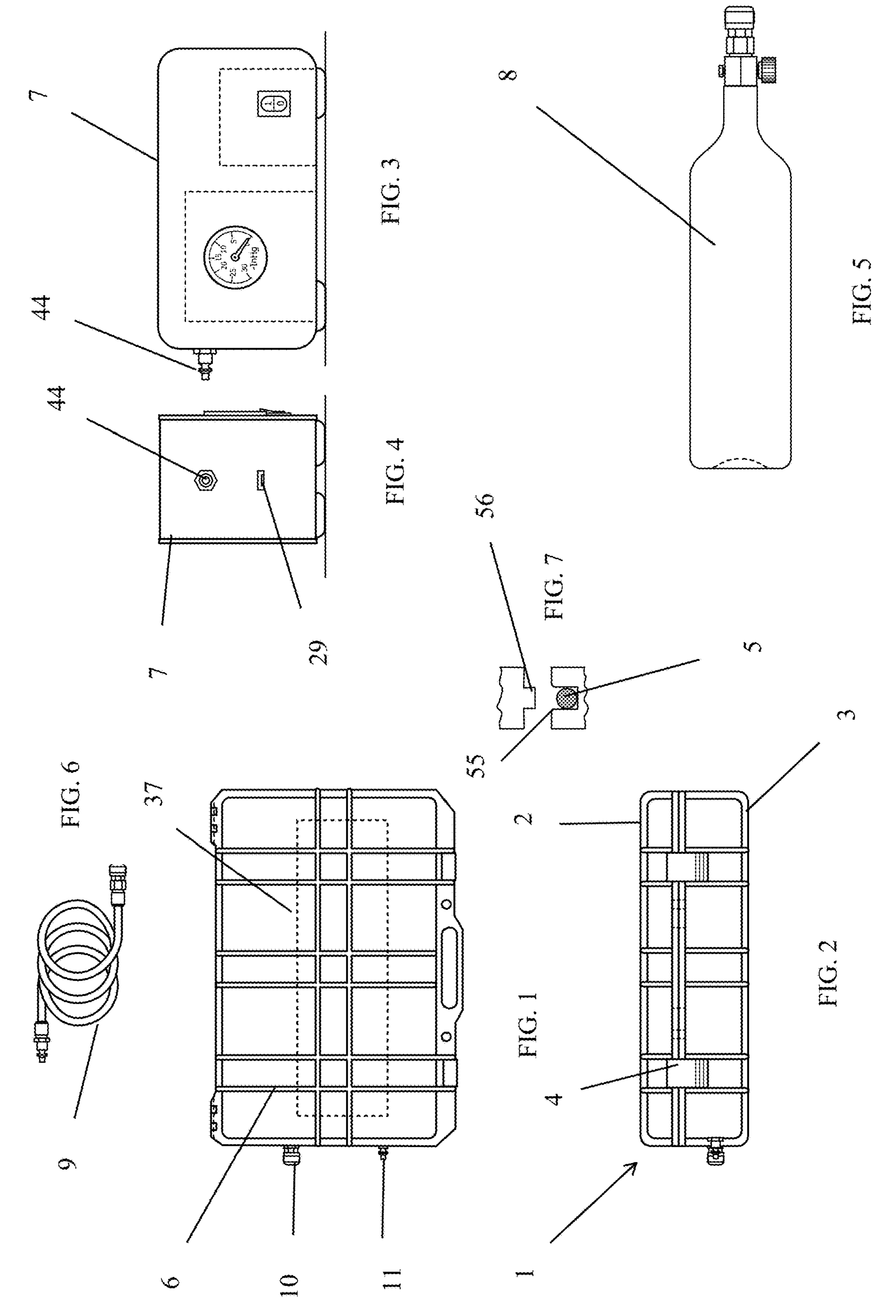
FIG. 1 is an isolated, top view of the case.
FIG. 2 is an isolated, front view of the case.
FIG. 3 is an isolated, front view of the vacuum pump.
FIG. 4 is an isolated, end view of the vacuum pump.
FIG. 5 is an isolated view of the reusable nitrogen bottle.
FIG. 6 is an isolated view of the vacuum hose.
FIG. 7 is an isolated, sectional view of the casket-type seal.

The present invention relates to a dryer for a portable electronic device 37 comprising a hollow case 1 having a top wall, a bottom wall, a front wall, a rear wall, and a pair of opposing sidewalls. The case is formed of a top section 2 and a bottom section 3 that open and close in a clamshell type fashion. The top section 2 includes a pair of over-center clamps 4 that detachably grip mating latches on the bottom section 3. The bottom section 3 further includes a peripheral gasket 5 received within a mating groove 55 that forms an air-impermeable seal with a peripheral flange 56 on the top section when the clamps are engaged. In the preferred embodiment, the gasket is a casket-style seal though the type of seal can be varied. The case outer walls are reinforced with integral ribs 6 that prevent the case from collapsing when a vacuum is applied.

The case further includes an interior compartment that is dimensioned to receive a vacuum pump 7, a nitrogen bottle 8, hoses 9 and most portable electronic devices, i.e., up to a 17" laptop computer. The pump is operated with an internal battery that is rechargeable with a charging cable (not pictured) that connects to a charging receptacle 29 on the pump exterior. One of the hoses 9 can be connected to a vacuum port 10 on a sidewall of the case and a similar port 44 on the pump 7. A second hose can be connected to the nitrogen bottle 8 and a nitrogen inlet port 11 adjacent the vacuum port 10 to deliver nitrogen to the case interior.

Accordingly, to dry a wet electronic device, a user removes the pump, hoses, and nitrogen bottle, then places the electronic device in the case interior. The user connects the first hose to the pump 7 and the vacuum port 10. A second hose is connected to the nitrogen bottle 8 and the inlet port 11, the top section 2 is closed, and the clamps are secured to create an airtight seal between the two case sections. First, the pump is activated for a predetermined duration to remove atmospheric water vapor. The pump is then disabled, and the nitrogen bottle valve 22 is opened to saturate the case with nitrogen to remove any residual moisture from the electronic device. The hoses, pump and nitrogen bottle are then restored to the case interior until needed.

In an alternate embodiment, the drying process can be implemented without removing the pump or nitrogen bottle. The case includes a vacuum chamber and a storage chamber that are separated by a ribbed bulkhead. The pump and nitrogen bottle are fixed within the storage chamber and are connected to vacuum and nitrogen ports mounted on the bulkhead. Each chamber is selectively enclosable with a designated lid having a set of clamps of the type described above. An electronic device is positioned within the vacuum chamber and its designated lid is securely closed. The user activates the vacuum pump for a predetermined duration, then opens the nitrogen valve as described above.

Yet another embodiment includes a dual-chambered case of the type described above, a microcontroller, digital sensors, and a pair of solenoids that automate the moisture-removal process. When the user depresses an activation button, the vacuum and nitrogen purge are initiated automatically, and LEDs are illuminated when the process has been completed. In the automated version, the case could also include a heating blanket to assure complete moisture removal. When the pump is first activated, it will remove air and cause any internal moisture to boil or vaporize. As the vaporized moisture is removed, the temperature of the remaining moisture will begin decreasing. When the remaining moisture temperature approaches freezing, a sensor disables the vacuum pump, and the heating blanket is activated to increase the internal temperature of the casing to approximately 80-100° F. The casing is then saturated with nitrogen until the internal pressure is approximately −5 to 0 psi at which time the moisture is again vaporized. The pump is reactivated to withdraw the water vapor until the case maintains a constant internal temperature indicating that no moisture is remaining.

The above-described device is not limited to the exact details of construction and enumeration of parts provided herein. Furthermore, the size, shape, and materials of construction of the various components can be varied without departing from the spirit of the present invention.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A dryer for portable electronic devices comprising:

a hollow case having an exterior surface, said hollow case formed of a top section and a bottom section that open and close in a clamshell-type fashion, said bottom section having an interior compartment with a vacuum pump, a nitrogen bottle, and at least a pair of hoses received therein, said interior compartment dimensioned to receive a portable electronic device;

a vacuum port on the exterior surface of said case;

a nitrogen port on the exterior surface of said case, whereby one of said hoses is connected to the vacuum port and said vacuum pump to remove moisture from the interior compartment, and a second of said hoses is connected to the nitrogen bottle and said nitrogen port to deliver nitrogen to the interior compartment.

2. The dryer for portable electronic devices according to claim 1 wherein said top section includes a pair of clamps that detachably grip mating latches on the bottom section.

3. The dryer for portable electronic devices according to claim 2 wherein said bottom section further includes a peripheral gasket received within a mating groove that forms an air-impermeable seal with a peripheral flange on the top section when the clamps are engaged.

4. The dryer for portable electronic devices according to claim 2 wherein the top section and the bottom section are sealed with a casket-style seal.

5. The dryer for portable electronic devices according to claim 2 the exterior surface of said case is reinforced with integral ribs that prevent the case from collapsing when a vacuum is applied.

* * * * *